(12) United States Patent
Wong

(10) Patent No.: US 7,477,886 B1
(45) Date of Patent: Jan. 13, 2009

(54) CASCADING-SYNCHRONOUS MIXER AND METHOD OF OPERATION

(75) Inventor: Hee Wong, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 609 days.

(21) Appl. No.: 11/098,766

(22) Filed: Apr. 4, 2005

Related U.S. Application Data

(63) Continuation of application No. 09/895,935, filed on Jun. 29, 2001, now Pat. No. 6,876,844.

(51) Int. Cl.
*H04B 1/26* (2006.01)

(52) U.S. Cl. ......... 455/314; 455/324

(58) Field of Classification Search ......... None
See application file for complete search history.

(56) References Cited

U.S. PATENT DOCUMENTS

| | | | | |
|---|---|---|---|---|
| 4,580,289 | A * | 4/1986 | Enderby | 455/314 |
| 5,108,334 | A * | 4/1992 | Eschenbach et al. | 455/314 |
| 5,761,615 | A * | 6/1998 | Jaffee | 455/314 |
| 5,937,335 | A * | 8/1999 | Park et al. | 455/86 |
| 2001/0015995 | A1 | 8/2001 | Emery et al. | |
| 2001/0024450 | A1 | 9/2001 | Takato et al. | |
| 2004/0091025 | A1 | 5/2004 | Sindhushayana et al. | |

* cited by examiner

*Primary Examiner*—Thanh C Le

(57) ABSTRACT

A radio frequency (RF) demodulation circuit comprising: 1) a radio frequency (RF) mixer having a first input port capable of receiving an incoming RF signal having a frequency of RF and a second input port capable of receiving a first local oscillator (LO) signal having a frequency of LO, wherein the RF mixer generates a first intermediate frequency (IF) signal having a frequency of IF; 2) a frequency divider circuit capable of receiving the first LO signal having the frequency of LO and generating therefrom a second local oscillator (LO) signal having a frequency of LO/N and synchronized with the first LO signal; and 3) an intermediate frequency (IF) mixer having a first input port capable of receiving the first IF signal and a second input port capable of receiving the second LO signal having the frequency of LO/N, and wherein the IF mixer generates a baseband output signal.

20 Claims, 3 Drawing Sheets

CASCADING-SYNCHRONOUS MIXER AND METHOD OF OPERATION

This application is a continuation of prior U.S. patent application Ser. No. 09/895,935 filed on Jun. 29, 2001 now U.S. Pat. No. 6,876,844.

TECHNICAL FIELD OF THE INVENTION

The present invention is generally directed to radio frequency (RF) receivers and, in particular, to a cascading synchronous mixer for use in a single chip radio receiver.

BACKGROUND OF THE INVENTION

Business and consumers use a wide array of wireless devices, including cell phones, wireless local area network (LAN) cards, global positioning system (GPS) devices, electronic organizers equipped with wireless modems, and the like. The increased demand for wireless communication devices has created a corresponding demand for technical improvements to such devices. Generally speaking, more and more of the components of conventional radio receivers and transmitters are being fabricated in a single integrated circuit (IC) package. In order to simplify single chip designs and to make each design suitable for as many applications as possible, much emphasis has been placed on developing direct conversion receivers and so-called "software-defined" radios.

Generally, the demodulation in these radios requires a single multiplication step to recover the transmitted baseband information. A mixer functions as the demodulator. However, a physical mixer also introduces signal leakages among its signal ports (RF input, LO input, and IF output). The signal leakages develop DC-offset levels that change dynamically when the operating environment of the receiver changes. As a result of these impairments, demodulation errors occur.

Many RF receiver designs implement control loops to track and compensate for the unwanted offset disturbances. However, many of these control loops are difficult and expensive to implement in a single integrated circuit package. Many designs require complicated image-rejection filters.

Therefore, there is a need in the art for improved RF receivers that are low cost, high performance and easily integrated into a single integrated circuit chip. In particular there is a need for a RF mixer that minimizes the amount of signal leakage introduced at the RF input port, the local oscillator input port and the intermediated frequency (IF) output port.

SUMMARY OF THE INVENTION

To address the above-discussed deficiencies of the prior art, it is a primary object of the present invention to provide an RF demodulation circuit that uses a two step mixing process to combat the impairments described above. The present invention has a simple architecture, but offers high level performance at low cost. No complicated image-rejection filters are required and digital implementation of an in-phase and quadrature phase LO clock source is provided. An RF mixer according to the principles of the present invention is an ideal solution for manufacturing high volume RF receivers on a single chip.

According to a first advantageous embodiment of the present invention, there is provided a radio frequency (RF) demodulation circuit comprising: 1) a radio frequency (RF) mixer having a first input port capable of receiving an incoming RF signal having a frequency of RF and a second input port capable of receiving a first local oscillator (LO) signal having a frequency of LO, wherein the RF mixer generates a first intermediate frequency (IF) signal having a frequency of IF; 2) a frequency divider circuit capable of receiving the first LO signal having the frequency of LO and generating therefrom a second local oscillator (LO) signal having a frequency of LO/N and synchronized with the first LO signal; and 3) an intermediate frequency (IF) mixer having a first input port capable of receiving the first IF signal and a second input port capable of receiving the second LO signal having the frequency of LO/N, and wherein the IF mixer generates a baseband output signal.

According to a second advantageous embodiment of the present invention, there is provided a radio frequency (RF) demodulation circuit comprising: 1) a radio frequency (RF) mixer having a first input port capable of receiving an RF signal having a frequency of RF and a second input port capable of receiving a first local oscillator (LO) signal having a frequency of LO, wherein the RF-mixer generates a first intermediate frequency (IF) signal having a frequency of IF; 2) a frequency divider circuit capable of receiving the first LO signal and generating therefrom an in-phase local oscillator (LO) signal having a frequency of LO/N and synchronized with the first LO signal and a quadrature local oscillator (LO) signal having a frequency of LO/N and synchronized with the first LO signal; 3) a first IF mixer having a first input port capable of receiving the first IF signal and a second input port capable of receiving the in-phase LO signal, wherein the first IF mixer generates an in-phase baseband output signal; and 4) a second IF mixer having a first input port capable of receiving the first IF signal and a second input port capable of receiving the quadrature LO signal, wherein the second IF mixer generates a quadrature baseband output signal.

According to one embodiment of the present invention, N is an integer. According to another embodiment of the present invention, N is an even integer. According to still another embodiment of the present invention, N is 4. According to yet another embodiment of the present invention: a) N is an even integer, b) RF=LO+IF, and c) LO=IF(N).

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged radio frequency (RF) receiver.

Figure 1:
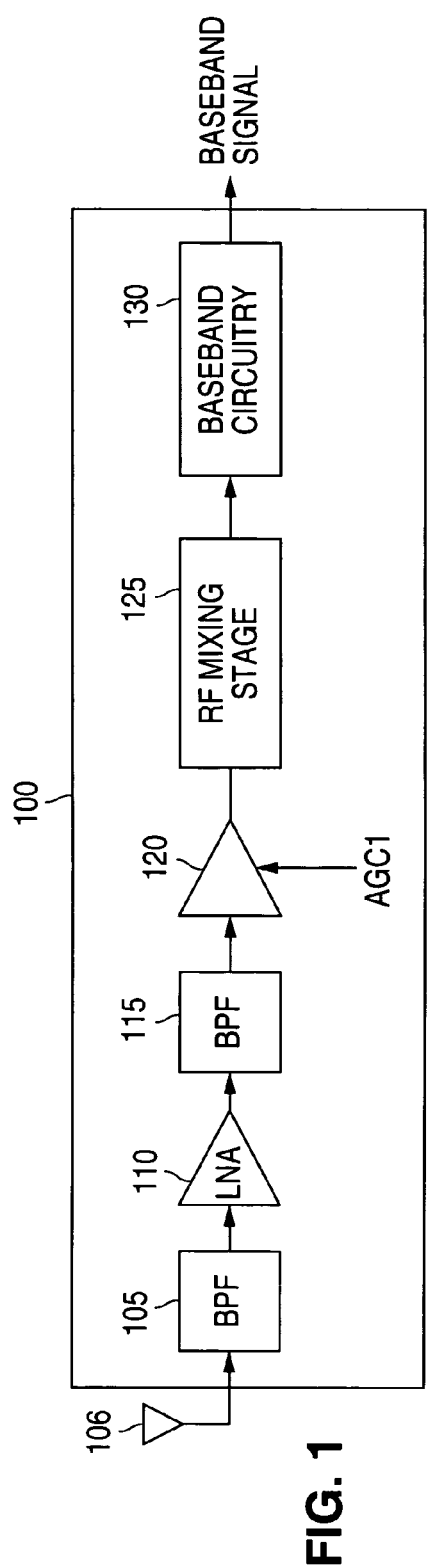
FIG. 1 illustrates selected portions of the receive signal path of an exemplary RF transceiver according to one embodiment of the present invention.

FIG. 1 illustrates selected portions of the receive signal path of exemplary RF receiver 100 according to one embodiment of the present invention. RF receiver 100 may be implemented in any conventional one-way or two-way RF communication device, including a cell phone, a wireless network card, a two-way pager, and the like. For the purpose of simplifying the explanation of the present invention, the transmitter portion of a two-way communication embodiment of the present invention is not shown.

The RF receive path through RF receiver 100 comprises band pass filter (BPF) 105, which receives an incoming RF signal from antenna 106. The RF receive path further comprises low-noise amplifier (LNA) 110, band pass filter (BPF) 115, RF amplifier 120, RF mixing stage 125, and baseband circuitry 130.

BPF 105 isolates the frequencies of interest in the incoming RF signal from antenna 106 and filters out unwanted frequency bands. LNA 110 amplifies the filtered output of BPF 105 to an intermediate level. BPF 115 further filters the amplified output of LNA 110 to remove noise outside of the desired receiver frequency range that were amplified by, or introduced by, LNA 110. RF amplifier 120 further amplifies the output of BPF 115 by a variable amount of gain determined by the gain control signal AGC1. RF mixing stage 125 down-converts the output of RF amplifier 120 by mixing it with a local oscillator reference signal. RF mixing stage 125 effectively shifts the information signal centered around the receiver RF operating frequency down to a baseband signal. Baseband circuitry 130 comprises additional filtering circuitry and automatic gain control circuitry that further improve the quality of the baseband signal from RF mixing stage 125.

Those skilled in the art will recognize that, in alternate embodiments of the present invention, one or more of BPF 105 and BPF 115 may be other types of filters, including low pass filters. The choice of bandpass filters in the exemplary embodiment described above is by way illustration only and should not be construed so as to limit the scope of the present invention.

Figure 2:
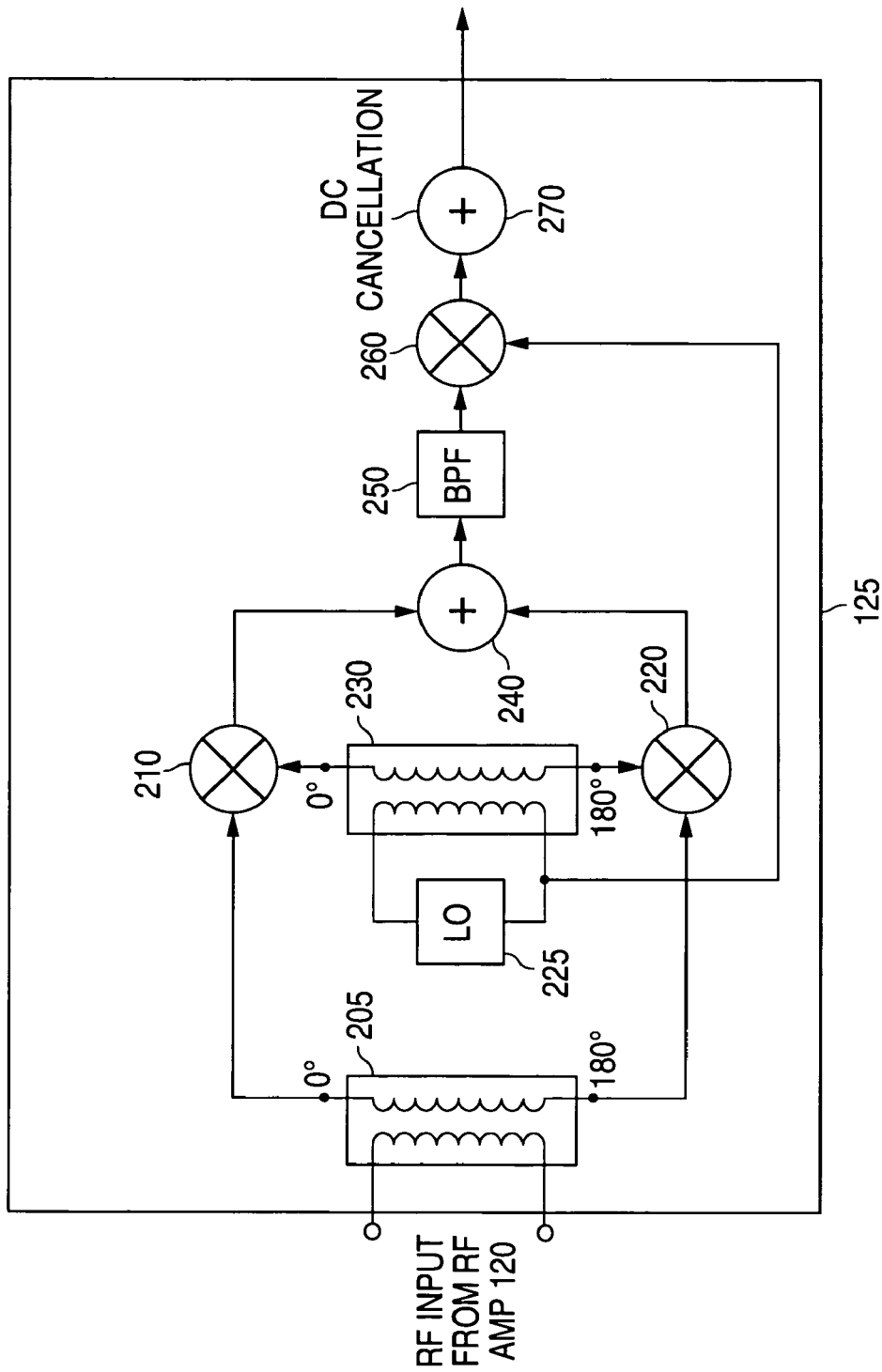
FIG. 2 illustrates selected portions of an improved radio frequency demodulator in the exemplary RF transceiver in FIG. 1 according to one embodiment of the present invention.

FIG. 2 illustrates selected portions of RF mixing stage 125 in exemplary RF receiver 100 according to one embodiment of the present invention. RF mixing stage 125 comprises transformer 205, RF mixers 210, RF mixer 220, local oscillator (LO) 225, transformer 230, signal combiner 240, bandpass filter 250, IF mixer 260, and signal combiner 270. Transformer 205 receives on its primary windings an RF input signal from the output of RF amplifier 120. On its output windings, RF transformer 205 generates a 0° phase shifted RF output signal (i.e., in-phase RF output) on a first output terminal and a 180° phase shifted RF output signal (i.e., out-of-phase RF output) on a second output terminal. The in-phase RF output signal is applied to a first input port of RF mixer 210. The out-of-phase RF output signal is applied to a first input port of RF mixer 220.

Local oscillator (LO) 225 generates a LO reference signal at one half the frequency of the RF input signal received by transformer 205. For instance, if the operating frequency of RF receiver 100 is 2.4 gigahertz (GHz), the RF input signal on the primary windings of transformer 205 is also at 2.4 GHz and LO 225 and generates a LO reference signal at 1.2 Ghz. The LO reference signal is applied to the primary windings of RF transformer 230. On its output windings, RF transformer 230 generates a 0° phase shifted LO output signal (i.e., in-phase LO output) on a first output terminal and a 180° phase shifted LO output signal (i.e., out-of-phase LO output) on a second output terminal. The in-phase LO output signal is applied to a second input port of RF mixer 210. The out-of-phase LO output signal is applied to a second input port of RF mixer 220.

RF mixer 210 produces an intermediate frequency output signal at RF–LO=IF. Since LO=(RF)/2, the IF frequency also equals (RF)/2. In, the example given above, where RF=2.4 GHz and LO=1.2 GHz, the IF frequency equals 1.2 Ghz. Similarly, RF mixer 220 produces an intermediate frequency output signal at RF–LO=IF. Since RF mixer 210 receives the in-phase RF input signal and the in-phase LO input signal and RF mixer 220 receives the out-of-phase RF input signal and the out-of-phase LO input signal, the IF output signal from RF mixer 210 and the IF output signal from RF mixer 220 are in phase with each other. However, the leakage is signals in the IF output signals from RF mixer 210 and RF mixer 220 caused by the in-phase and out-of-phase LO reference signals are not in phase with each other.

Because the IF output signal from RF mixer 210 and the IF output signal from RF mixer 220 are in phase with each other, signal combiner 240 adds the two IF output signals together to produce a larger composite IF output signal. However, since the leakage signals in the IF outputs from RF mixer 210 and RF mixer 220 are out of phase with each other, signal combiner 240 subtracts the two leakage signals to effectively cancel the leakage signals in the composite IF output signal on the output of signal combiner 240.

BPF 250 filters the composite IF output signal from signal combiner 240 to isolated the frequencies of interest at the LO frequency (e.g., 1.2 Ghz). BPF 250 has a low Q value at the LO frequency. The filtered composite IF output signal is applied to a first input port of IF mixer 260. The 180° phase shifted LO output signal (i.e., out-of-phase LO output) from LO 225 is applied to the second input port of IF mixer 260. It should be noted that there is no requirement that the 180° phase shifted LO output signal from LO 225 be used. In an alternative embodiment of the present invention, the 0° phase shifted LO output signal (i.e., the in-phase LO output) from LO 225 may be used by IF mixer 260.

IF mixer 260 produces an image signal at the frequency IF-LO. Since IF=LO, the output of IF mixer 260 is only the baseband signal with a small DC component. Signal combiner 270 receives the baseband signal on a first input port and a DC CANCELLATION signal on a second input port. The DC CANCELLATION signal effectively cancels the small DC component in the baseband signal. The control circuitry for generating the DC CANCELLATION signal is not shown for purposes of simplicity. Any convention DC cancellation feedback control loop is suitable for this purpose.

Furthermore, it should be noted that there is no requirement that transformers be used to produce the in-phase RF output signal, the out-of-phase RF output signal, the in-phase LO output signal, and the out-of-phase LO output signal. Transformers 205 and 230 were selected for the purpose of illustration only. In alternate embodiments of the present invention, other types of circuits, including differential amplifiers, may be used to produce 0° phase shifted RF and LO output signals and 180° phase shifted RF and LO output signals.

An RF demodulation circuit according to the principles of the present invention provides very good spurious noise and image rejection. It also is inexpensive to fabricate and is therefore very suitable for single-chip radio devices. Because the local oscillator runs at one-half the frequency of the RF frequency, an RF demodulation circuit according to the principles of the present invention is a relatively low power device. It also has low local oscillator-to-antenna leakage.

Figure 3:
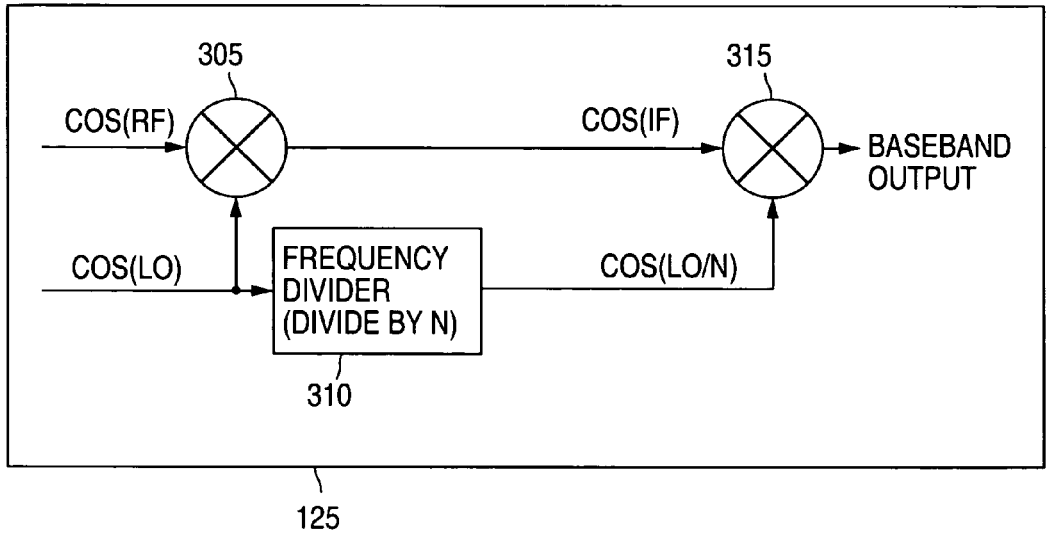
FIG. 3 illustrates selected portions of an improved radio frequency demodulator according to a second embodiment of the present invention.

FIG. 3 illustrates selected portions of an improved radio frequency demodulator in exemplary RF mixing stage 125 according to a second embodiment of the present invention. Conventional receiver path circuitry, such as low-pass filters, bandpass filters, amplifiers, and the like, may be omitted in order to simplify the explanation of the present invention. RF, mixing stage 125 comprises RF mixer 305 (hereafter sometimes referred to as "the first mixer"), frequency divider circuit 310, and intermediate frequency (IF) mixer 315 (hereafter sometimes referred to as "the second mixer").

RF mixer 305 receives an incoming RF signal, cos(RF), and a first local oscillator (LO) reference signal, cos(LO), and down-converts cos(RF) to produce an intermediate frequency (IF) signal, cos(IF). Frequency divider signal 310 receives the local oscillator reference signal, cos(LO), and divides down the frequency by a value N to produce a second local oscillator (LO) reference signal, cos(LO/N). IF mixer 315 receives the cos(IF) signal and the cos(LO/N) signal and down-converts the cos(IF) signal to produce a baseband output signal that is sent to subsequent automatic gain control (AGC) amplifiers and channel filters.

The frequency manipulation of RF mixer 305 and IF mixer 315 is similar to the frequency manipulation of a conventional superheterodyne receiver. The signal type of cos(IF) at the input port of IF mixer 315 is equivalent to the IF signal of a superheterodyne receiver. However, unlike these existing receivers, the frequency is not constant and varies according to the received incoming RF frequency.

Since $RF = LO + IF$
$= N(IF) + IF$
$= IF(N + 1),$ then IF=RF/(N+1) and LO=RF(N)/(N+1).

In addition, there are no intermediate frequency (IF) AGC amplifiers or channel filters between the first mixer (i.e., RF mixer 305) and the second mixer (IF mixer 315). All signal amplification and channel filtering is performed on the baseband signal. Due to the absence of IF signal processing, it is feasible to pick a high IF frequency to improve image-rejection performance.

An important feature offered by frequency-divider circuit 310 is the feasibility of implementing a low cost digital IQ-LO clock generator. This eliminates the need for delaying devices that are process-dependant and sensitive to many design parameters.

Figure 4:
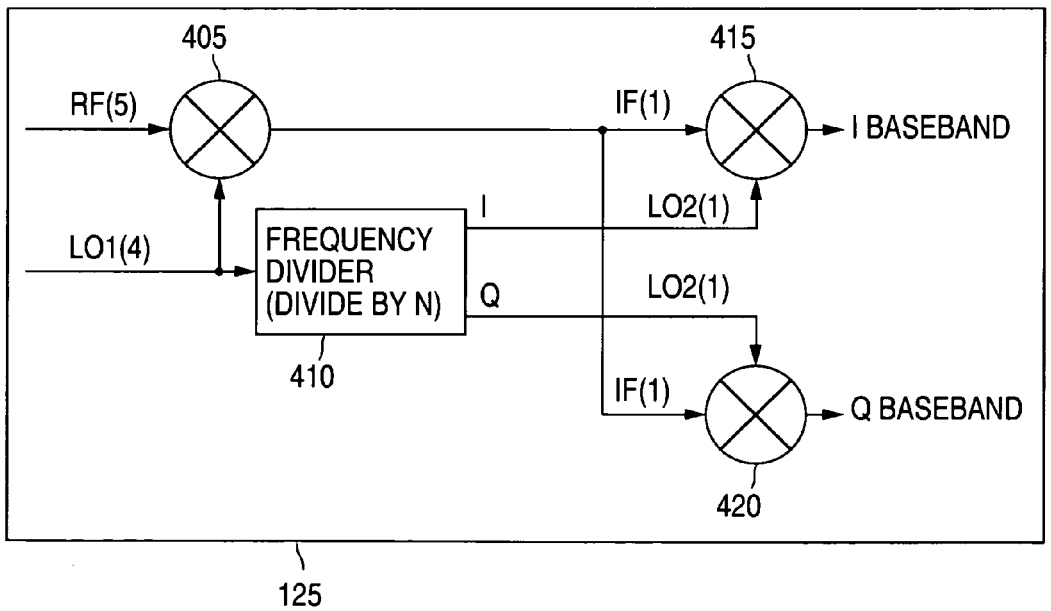
FIG. 4 illustrates selected portions of an improved radio frequency demodulator according to a third embodiment of the present invention.

FIG. 4 illustrates selected portions of an improved radio frequency demodulator in exemplary RF mixing stage 125 according to a third embodiment of the present invention. FIG. 4 shows a practical I-Q receiver utilizing the cascading-synchronous mixer scheme. The second mixer (i.e., the IF mixer) consists of two identical mixers for demodulating both the in-phase (I) and the quadrature (Q) baseband signals. The two local oscillator (LO) driving signals are derived from corresponding outputs of an IQ-LO clock generator. Again, conventional receiver path circuitry, such as low-pass filters, bandpass filters, amplifiers, and the like, may be omitted in order to simplify the explanation of the present invention.

RF mixing stage 125 comprises RF mixer 405 (hereafter sometimes referred to as "the first mixer"), frequency divider circuit 410, a first intermediate frequency (IF) mixer 415 (hereafter sometimes referred to as "the I channel mixer"), and a second intermediate frequency (IF) mixer 420 (hereafter sometimes referred to as "the Q channel mixer"). RF mixer 405 receives an incoming RF signal, RF(5), and a first local oscillator (LO) reference signal, LO1(4), and down-converts RF(5) to produce an intermediate frequency (IF) signal, IF(1). Frequency divider signal 410 receives the LO1(4) and divides down the frequency by a value N to produce an in-phase local oscillator (LO) reference signal, LO2I(1), and a quadrature local oscillator (LO) reference signal, LO2Q(1). IF mixer 415 receives the IF(1) signal and the in-phase signal, LO2I(1), and down-converts the IF(1) signal to produce an in-phase (I) baseband output signal that is sent to subsequent automatic gain control (AGC) amplifiers and channel filters. IF mixer 420 receives the IF(1) signal and the quadrature signal, LO2Q(1), and down-converts the IF(1) signal to produce a quadrature (Q) baseband output signal that is sent to subsequent automatic gain control (AGC) amplifiers and channel filters.

The frequency-divider, N, is an integer divider greater than or equal to 1. In the example above, N=4. The numbers in parenthesis are normalized frequencies based on LO2=1. Hence, the RF signal, RF(5), has a frequency five times greater than LO2(1), the first LO signal, LO1(4), has a frequency four times greater than LO2(1), and the IF signal, IF(1), has a frequency equal to LO2(1). By way of example, RF(5) may be 1.0 GHz, LO1 may be 800 MHz, LO2(1) may be 200 MHz, and IF(1) may be 200 MHz. By definition, the baseband frequency has a value of zero (i.e., baseband=IF−LO2=0).

The following are the values of the normalized receiver frequencies:

| | |
|---|---|
| Baseband = | 0 |
| LO2 = | 1 |
| IF = | 1 |
| LO1 = | N |
| RF = | N + 1 |
| Image = | N − 1 |

The value of N heavily influences the characteristics of the receiver. There are three important factors to consider before choosing its value:

1. Optimizing for Good Image-Rejection Performance—

Very small values for N are required such that the ratio Image/RF (or (N−1)/(N+1)) is small. Large values of N set the frequency of LO1 very close to the frequency of RF, which results in very poor image-rejection performance. When N=4, the ratio of Image/RF becomes ⅗ or 0.6. This setting provides very good image-rejection and is better than most conventional superheterodyne receivers. Note that the value of N only changes the frequency separation of Image and RF while the frequency response of the antenna band-select filter determines the amount of rejection at the Image frequency.

2. Providing a High-Frequency Clock Source for Implementing a Digital IQ-LO Clock Generator—

A high value of N allows maximum flexibility when designing the multi-phase divider chain. A basic IQ-LO generator requires two phases (0° and 90°) and letting N=4 will satisfy this design requirement. When more phases are required, the setting of N should be higher.

3. Avoiding any Zero-Beat Frequency Components Generated Within the Receiver—

When there is more than one frequency source within a system, beating occurs. Although most beat components do not interfere with the demodulating function due to out-of-band frequencies, the beat components usually consume dynamic range of the receiver. These beat components are also determined by the harmonic frequencies of all system signals and mixer types utilized. There are two common circuit types for implementing the mixers: 1) an analog-multiplying mixer and 2) a switching mixer.

The analog-multiplying mixer performs the basic multiplying function where the output is simply the product of two original input signals. The switching mixer offers better signal linearity and noise performance and is widely used in receiver circuits. This class of mixers utilizes signal transfer switches to connect the RF input port to the IF output port. The mixing function is accomplished by reversing the output polarity of the two differential IF outputs at a rate of the LO frequency. Thus, the LO drive requires a square-wave signal which contains significant odd harmonic contents.

Implementing the cascading-synchronous mixer with switching mixers may result in many beat components with significant amplitudes. Possible beating sources are: 1) the LO1 leakage to the RF input port of the 2nd mixer; and 2) the LO2 harmonics. The value of N controls the frequency ratio of these two beating sources (LO1 and LO2). By altering the value of N, the resulting beat components can be placed at out-of-band frequencies such that simple filters can remove these components.

For illustration purposes, consider the value of N varying from 1 to 4 and the resulting beat components. For the sake of simplicity, the product of two cosines indicates only the difference of the two input terms.

Let:

| | |
|---|---|
| LO1 = 1 to 4, | frequency of LO1 or. IF (due to leakage); |
| LO2 = 1, | frequency of LO2; |
| LO2 (3H) = 3, | frequency of 3rd harmonic of LO2; |

Therefore:

| | | |
|---|---|---|
| cos (IF) cos (LO2 (3H)) => | cos (IF − LO2 (3H)) | |
| cos (1) cos (3) => | cos (1-3) | <= out-of-band |
| cos (2) cos (3) => | cos (2-3) | <= out-of-band |
| cos (3) cos (3) => | cos (3-3) | <= zero-beat |
| cos (4) cos (3) => | cos (4-3) | <= out-of-band | obviously, zero-beat components occur when N is equal to the Nth harmonic of LO2.

When N is odd, the magnitude of the beat components is significant because the driving LO source is a square-wave that has substantial odd harmonic contents. N=3 yields the most severe case: the amplitude of the 3rd harmonic is ⅓ of the amplitude of the fundamental frequency of the square wave. The amplitudes of higher order harmonics fall off with increasing order.

When N is even, the magnitude of the beat components is insignificant because even harmonics are not present unless the mixer circuits exhibit linearity problems. Note that all harmonics (odd and even) exhibit even multiples of the LO2 frequency from the LO1 if N is even. The harmonics from LO1, including its fundamental, cause no zero-beat components when N is even.

The cascading-synchronous mixer according to the principles of the present invention has a simple architecture yet offers many advantages. These advantages include:

1. Low Cost, Low Power, Small Size, Low Component Sensitivity—The cascading-synchronous mixer eliminates the need for expensive analog image-rejection filters and delay elements (for implementing IQ-LO). It exhibits very low performance degradation due to changes in circuit parameters. It requires no trimming.

2. Good Signal Isolation From LO1 to Antenna—The frequency ratio of LO1/RF is 0.8 when N=4. At this frequency ratio, the front-end low noise amplifier (LNA) and the antenna band-select filter should provide very good isolation from LO to antenna (better than most superheterodyne receivers because of wide frequency separation).

3. Immunity to LO1-to-IF Leakage and LO1 Self-Mixing Problems—The frequency of LO1 is N times higher than the frequency IF. The leakage from LO1, if any, can be effectively removed by simple low-pass filter before driving the second mixer, IF mixer 415. Even connecting the unfiltered output of the first mixer, RF mixer 405, directly to IF mixer 415 would not cause any system problems.

In addition, zero-beat components due to LO1 self-mixing are of no significance. These components can be removed by simple high-pass filter before driving IF mixer 415. As with the LO1-to-IF leakage, connecting even the unfiltered RF mixer 405 output directly to IF mixer 415 would not cause any system problems. In theory, the product of DC due to LO1 self-mixing and cos(LO2) is a high frequency signal (equivalent to that of cos(LO2)) which cannot pass through the baseband filters placed after the mixer.

4. Good Image-Rejection Performance—The Image/RF ratio is 0.6 when N=4. This provides adequate frequency separation for the antenna band-select filter to achieve good image-rejection performance. This is better than most superheterodyne receivers because of the wide frequency separation. Moreover, the architecture does not preclude the addition of an image-rejection filter between RF mixer 405 and IF mixer 415. One can obtain extremely good image-rejection (in excess of 80 dB) with this method.

5. Low Cost and Precision IQ-LO Clock Generator—When N is larger than 1, a digital implementation of an IQ-LO clock generator is allowed.

6. No Cumulative Phase Noise—The LO1 and LO2 signals are driven by virtually the same clock source except for the inclusion of frequency divider circuit 410 before LO2. These two LO clocks are highly correlated, such that there is virtually no differential low-frequency phase noise between the two clocks. Therefore, insignificant cumulative phase noise would be added to the final baseband output. Also, LO2 denotes both the I and the Q clocks from the IQ-LO. These two clocks differ only by one clock cycle delay. Thus the differential low-frequency phase noise between these two clocks is again insignificant.

7. Low-IF Radio Applications—The cascading-synchronous mixer is primarily designed for low cost, zero-IF radio applications. However, one can change the baseband frequency value from 0 to a small number (<<1) so that the composite-mixer provides a low-IF output instead of the baseband output. An image-rejection filter is required after IF mixer 415 because of the low IF frequency . . . . Nevertheless, this approach still provides advantages because the image-rejection filter can operate at low IF frequencies instead of high RF frequencies.

8. Ideal for System Integration—The present invention can be implemented in a fully differential mode for enhancing noise rejection and circuit performance during system integration.

Software-defined radios (SDRs) are not completely software implementations. Hardware subsystems, such as an analog-to-digital converter (ADC) and other analog blocks, are still required. A design objective of software-defined radios is to move the A/D converter as close as possible to the antenna. However, an analog band-select filter together with a low-noise amplifier (LNA) may still be necessary before the A/D converter to improve noise performance. An analog voltage controlled-oscillator (VCO) must be present for channel selection and providing clocks to all digital signal processing (DSP) circuits.

If a software-defined radio is implemented as in a conventional direct-conversion radio, the frequency of the local oscillator (LO) is identical to the RF frequency. Since the front-end of the radio consists of several analog blocks, the radio would suffer from LO leakage problems, similar to most hardware direct-conversion radios. Unfortunately, problems due to LO leakage are fundamental characteristics of the direct-conversion architecture. As a result, only work-around solutions exist. Known solutions, such as extensive shielding, multiple LNAs, or reduced LO power, are costly and not very effective.

Figure 5:
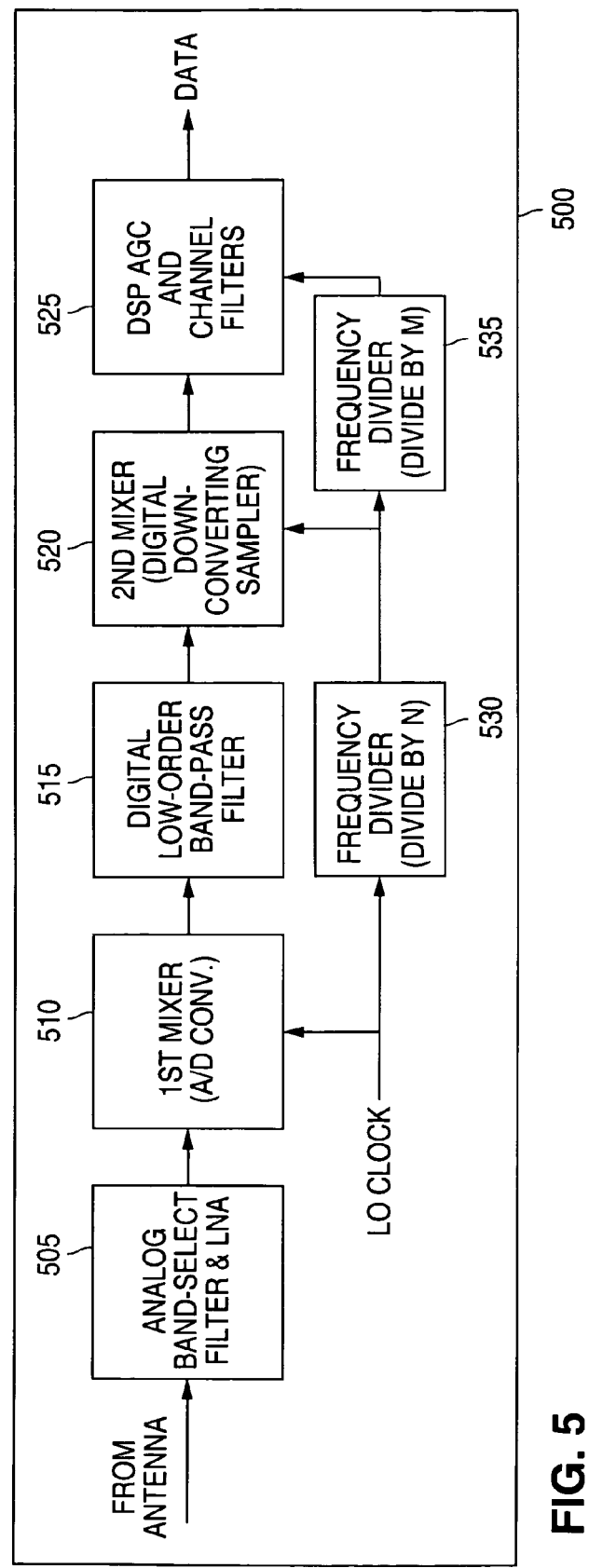
FIG. 5 illustrates selected portions of the software-defined radio, which includes a cascading synchronous mixer scheme according to one embodiment of the present invention.

A better solution is to employ a cascading-synchronous mixer scheme in accordance with the principles of the present invention. FIG. 5 illustrates selected portions of software-defined radio 500, which includes a cascading synchronous mixer scheme according to one embodiment of the present invention. Software defined radio 500 comprises analog band-select filter and low-noise amplifier (LNA) stage 505, first mixer stage 510, digital low-order band-pass filter stage 515, second mixer stage 520, digital signal processor (DSP) automatic gain control (AGC) and channel select filters stage 525, frequency divider circuit 530 and frequency divider stage 535.

First mixer stage 510 is an analog-to-digital converter stage that receives the filtered and amplified output from analog band-select filter and low-noise amplifier (LNA) stage 505 on one input and the LO clock reference signal on a second input and produces a sampled digital output signal. Digital low-order band-pass filter stage 515, which receives the output of first mixer stage 510, is placed after the A/D converter to relax the DC (and low frequency) performance of the A/D converter to achieve better resolution at a reduced cost. Second mixer stage 520 is a simple digital sampling circuit that may eliminate the need for a decimator. The LO clock for second mixer stage 520 is provided by frequency divider circuit 530. The system uses a fully synchronous clock circuit which is an important integrating aspect of a single-chip radio.

Although the present invention has been described in detail, those skilled in the art should understand that they can make various changes, substitutions and alterations herein without departing from the spirit and scope of the invention in its broadest form.

What is claimed is:

1. A demodulation circuit, comprising:
a first mixer having a first input capable of receiving an incoming analog signal and a second input capable of receiving a first local oscillator (LO) signal;
a first frequency divider capable of receiving the first LO signal and generating a second LO signal;
a second mixer having a first input capable of receiving an output of the first mixer and a second input capable of receiving the second LO signal;
a second frequency divider capable of receiving the second LO signal and generating a third LO signal; and
a digital signal processor (DSP) analog gain control (AGC) and channel filters stage capable of receiving an output of the second mixer and the third LO signal.

2. The demodulation circuit of claim 1, wherein:
the first LO signal has a frequency of LO;
the second LO signal has a frequency of LO/N; and
the third LO signal has a frequency of (LO/N)/M.

3. The demodulation circuit of claim 1, wherein:
the first mixer is configured to operate as an analog-to-digital converter; and
the second mixer is configured to operate as a digital sampling circuit.

4. The demodulation circuit of claim 3, further comprising:
a digital band-pass filter coupled between the first and second mixers.

5. The demodulation circuit of claim 4, wherein the digital band-pass filter comprises a low-order digital band-pass filter.

6. The demodulation circuit of claim 1, wherein the DSP AGC and channel filters stage is configured to output data recovered from the incoming analog signal.

7. The demodulation circuit of claim 1, wherein the demodulation circuit forms a portion of a software-defined radio.

8. A receiver, comprising:
a front-end circuit capable of providing an incoming analog signal; and
a demodulation circuit coupled to the front-end circuit and comprising:
a first mixer having a first input capable of receiving the incoming analog signal and a second input capable of receiving a first local oscillator (LO) signal;
a first frequency divider capable of receiving the first LO signal and generating a second LO signal;

a second mixer having a first input capable of receiving an output of the first mixer and a second input capable of receiving the second LO signal;

a second frequency divider capable of receiving the second LO signal and generating a third LO signal; and a digital signal processor (DSP) analog gain control (AGC) and channel filters stage capable of receiving an output of the second mixer and the third LO signal.

9. The RF receiver of claim 8, wherein:

the first LO signal has a frequency of LO;

the second LO signal has a frequency of LO/N; and the third LO signal has a frequency of (LO/N)/M.

10. The receiver of claim 8, wherein:

the first mixer is configured to operate as an analog-to-digital converter; and the second mixer is configured to operate as a digital sampling circuit.

11. The receiver of claim 10, further comprising:

a digital band-pass filter coupled between the first and second mixers.

12. The receiver of claim 8, wherein the front-end circuit comprises an analog band-select filter and low-noise amplifier stage configured to provide the incoming analog signal.

13. The receiver of claim 8, wherein the DSP AGC and channel filters stage is configured to output data recovered from the incoming analog signal.

14. The receiver of claim 8, wherein the receiver forms a portion of a software-defined radio.

15. A method, comprising:

mixing an incoming analog signal with a first local oscillator (LO) signal to generate a first output signal;

dividing the first LO signal to generate a second LO signal;

mixing the first output signal and the second LO signal to generate a second output signal;

dividing the second LO signal to generate a third LO signal; and recovering data from the incoming analog signal using the second output signal and the third LO signal.

16. The method of claim 15, wherein:

the first LO signal has a frequency of LO;

the second LO signal has a frequency of LO/N; and the third LO signal has a frequency of (LO/N)/M.

17. The method of claim 15, wherein:

the first mixer operates as an analog-to-digital converter; and the second mixer operates as a digital sampling circuit.

18. The method of claim 17, further comprising:

filtering the first output signal prior to mixing the first output signal and the second LO signal.

19. The method of claim 15, further comprising:

filtering and amplifying a received signal to produce the incoming analog signal.

20. The method of claim 15, wherein the mixing steps, the dividing steps, and the recovering step occur within a software-defined radio.

* * * * *